Dec. 30, 1930.                 E. LONDON                 1,786,855

TRACTION WHEEL

Filed May 29, 1929

Inventor
Earl London
By W.P. Daniels
Att'y

Patented Dec. 30, 1930

1,786,855

UNITED STATES PATENT OFFICE

EARL LONDON, OF CHAPMAN RANCH, TEXAS, ASSIGNOR TO INTERNATIONAL HARVESTER COMPANY, A CORPORATION OF NEW JERSEY

TRACTION WHEEL

Application filed May 29, 1929. Serial No. 366,815.

This invention relates to traction wheels, and particularly to the tread construction thereof.

The main objects of the invention are to provide a tread that will give efficient traction and support on wet and soft soils and will not retain the sticky soil with the resulting packing on the wheels so detrimental to the operation of tractors on wet lands. More specifically, the purpose of the invention is to provide a lugged tread structure having no openings or pockets into which soil can pack, but having a tread surface so formed as to give efficient traction and resistance to excessive sinking of the wheel into the soil. A further object is to provide a simple and efficient form of traction lug embodying structural features adapting it to be brought into cooperative relation with other lugs to constitute a reinforced tread structure.

The invention accordingly resides in the combination and the details of construction hereinafter more specifically described and illustrated in the accompanying drawings, wherein,—

Figure 1:
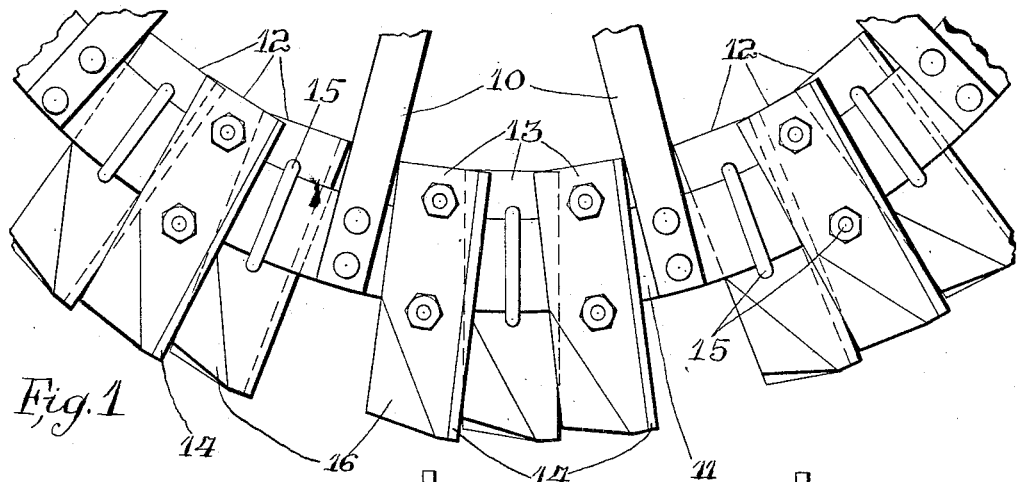
Figure 1 is a sectional side view of a portion of a wheel tread embodying the invention.

In the present instance, the invention has been illustrated as embodied in the structure of a wheel having the radial spokes 10 which are riveted or otherwise secured to a flat, radially extending rim plate 11. The rim plate 11 serves as a supporting member for multiple series of lugs 12, which in a wheel of the spoked construction shown are located between adjacent spokes. In Figure 1 they have been illustrated as arranged in groups of three, but the number of lugs in each group and their arrangement in groups on the wheel rim will, of course, be governed by the type of disk wheel on which the lugs are mounted.

Figure 2:
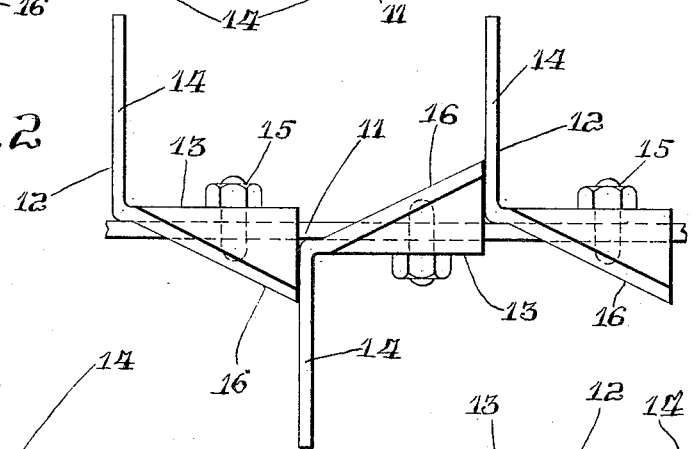
Figure 2 is a plan view of a section of the wheel tread.
Figure 3:
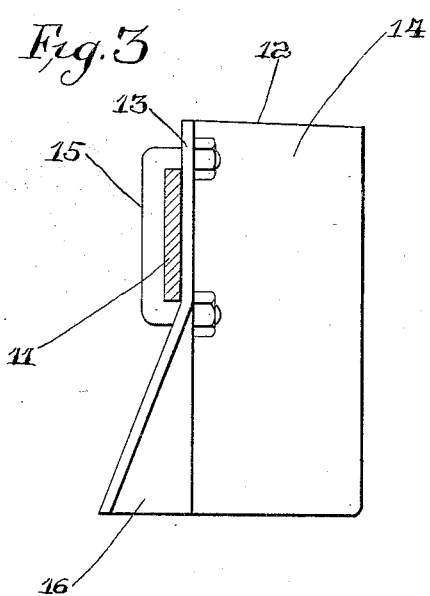
Figure 3 is a side elevation of one of the traction lugs.
Figure 4:
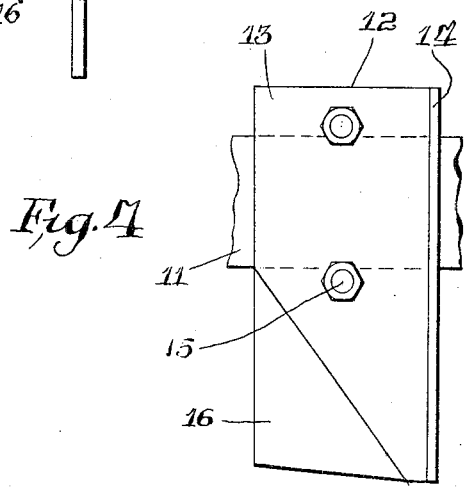
Figure 4 is a side view of the lug shown in Figure 3 as viewed from the right.

In the practice of the invention each of the lugs 12 is formed of a section of angle-iron having the wing 13, one end of which is adapted to lie in contact with a side face of the rim 11, and another wing 14 which extends at right angles away from the rim 11 when the lug is in position thereon. For attaching the lugs to the rim plate 11, the wing 13 may be provided with apertures near one end of the lug for receiving the arms of a U-bolt 15 embracing the rim plate 11. The several lugs are of identical construction and are secured to opposite faces of the rim plate 11 alternately and in offset relation to each other. Preferably the offset lugs on opposite sides of the rim plate are closely grouped and so arranged that longitudinal sides of the respective lugs are approximately in the same transverse radial plane, although they may overlap slightly at the inner ends, as shown in Figure 1, to allow for the curvature of the rim plate. The lugs extend beyond the outer edge of the rim plate for about half their total length. Each outer free corner of the wing 13 on each plate is bent laterally or outwardly, as at 16, in a manner to set the outer edge of the wing 13 obliquely across the plane of the rim plate 11, as clearly shown in Figure 2. As the wings 13 on the lugs are alternately bent in opposite directions, the central portion of the tread will present a zig-zag contour when viewed from above, as in Figure 2. Preferably each bent portion 16 of the wing 13 is brought into contact with the back of the wing 14 on the next lug, thus constituting a reinforcement or brace for that lug and making the lug series as a whole continuous and more rigid.

A wheel tread of the construction above described will accordingly be characterized as comprising a single rim or disk edge wheel having cooperating traction lugs which collectively afford a tread surface of considerable width, but presenting no closed pockets for retention of soil. It will be clear that the laterally extended wings 14 of the tread structure will give efficient traction, and the bent over portions 16 of the wing 13 will offer opposite inclined surfaces to the soil thus increasing resistance to excessive sinking of the wheel into the soil as well as having a reinforcing effect on the adjacent lugs.

The construction above described exemplifies a preferred form of the invention which may, however, be modified without departure from the spirit and scope of the invention as defined in the following claims.

What is claimed is:

1. A wheel tread structure comprising a radially extending plate, and a series of angle-iron lugs secured to the opposite faces, alternately, of the plate in offset relation and extending beyond the edge thereof, one web of each lug being bent laterally across the edge and over-hanging the opposite side of the plate.

2. A wheel tread structure comprising a radially extending flat rim, and lugs having elongated flat plates secured to the opposite faces, alternately, of the rim in offset relation and with the longitudinal sides of the respective plates approximately in the same transverse radial plane, the ends of said plates being alternately bent in opposite directions to set the outer edges thereof obliquely across the plane of the rim plate.

3. A wheel tread structure comprising a radially extending plate, and a series of angle-iron lugs each with one web thereof secured to one face of the plate with alternate lugs of the series located on opposite sides of the plate and offset to bring the longitudinal sides of the lugs into approximate transverse alignment, said lugs extending beyond the edge of the plate and having the portion of the attached web beyond said edge bent laterally across the edge into position to contact with a lug on the opposite side thereof.

4. A wheel tread structure comprising a radially extending flat rim plate, and separate traction lugs secured against the opposite faces of the rim plate in offset relation and extending beyond the outer edge of the plate with some of said lugs formed with a portion extending across the outer edge of the rim plate and engaging one side of a lug on the opposite face thereof.

5. A tractor lug comprising an elongated plate having longitudinal rectangular webs positioned in angular relation, one end of said plate being for ground engagement and one of said webs having its free corner at the ground engaging end bent outwardly, the other end of said web being adapted to be secured to the rim of a wheel.

In testimony whereof I affix my signature.

EARL LONDON.